United States Patent
Yahner

(10) Patent No.: US 10,570,001 B2
(45) Date of Patent: Feb. 25, 2020

(54) SYSTEMS AND METHODS FOR DETERMINING A RACK INTERFACE FOR A MATERIAL HANDLING VEHICLE

(71) Applicant: THE RAYMOND CORPORATION, Greene, NY (US)

(72) Inventor: Joseph T. Yahner, Chenango Forks, NY (US)

(73) Assignee: The Raymond Corporation, Greene, NY (US)

( * ) Notice: Subject to any disclaimer, the term of this patent is extended or adjusted under 35 U.S.C. 154(b) by 235 days.

(21) Appl. No.: 15/852,499

(22) Filed: Dec. 22, 2017

(65) Prior Publication Data

US 2018/0179038 A1 Jun. 28, 2018

Related U.S. Application Data

(60) Provisional application No. 62/438,816, filed on Dec. 23, 2016.

(51) Int. Cl.
*B66F 9/075* (2006.01)
*B66F 9/20* (2006.01)

(52) U.S. Cl.
CPC .............. *B66F 9/0755* (2013.01); *B66F 9/20* (2013.01); *G05D 2201/0216* (2013.01)

(58) Field of Classification Search
None
See application file for complete search history.

(56) References Cited

U.S. PATENT DOCUMENTS

| | | | |
|---|---|---|---|
| 4,411,577 A | 10/1983 | Shearer, Jr. | |
| 4,678,329 A | 7/1987 | Lukowski, Jr. et al. | |
| RE37,215 E | 6/2001 | Dammeyer et al. | |
| 6,952,488 B2 | 10/2005 | Kelly et al. | |
| 7,699,141 B2 | 4/2010 | Fossier et al. | |
| 9,317,037 B2 | 4/2016 | Byford et al. | |
| 9,715,232 B1 | 7/2017 | Fischer et al. | |
| 2003/0044047 A1 | 3/2003 | Kelly et al. | |
| 2016/0075542 A1* | 3/2016 | Buchmann | B66F 9/0755 414/667 |
| 2017/0015537 A1 | 1/2017 | Bosworth, III et al. | |

FOREIGN PATENT DOCUMENTS

| | | |
|---|---|---|
| EP | 3000773 A1 | 3/2016 |
| FR | 2608567 A1 | 6/1988 |
| JP | 2003020102 A | 1/2003 |
| JP | 2015170284 A * | 9/2015 |
| JP | 2015170284 A | 9/2015 |

OTHER PUBLICATIONS

European Patent Office, Extended European Search Report, Application No. 17209743.8, dated May 4, 2018, 12 pages.

* cited by examiner

*Primary Examiner* — Lail A Kleinman
(74) *Attorney, Agent, or Firm* — Quarles & Brady LLP

(57) ABSTRACT

A material handling vehicle with a rack sensor arranged on the one or more base legs is provided. The rack sensor is configured to detect a racking feature of a racking structure to provide an indication to an operator that the material handling vehicle is correctly positioned to transport a load to and from the racking structure.

20 Claims, 5 Drawing Sheets

SYSTEMS AND METHODS FOR DETERMINING A RACK INTERFACE FOR A MATERIAL HANDLING VEHICLE

CROSS-REFERENCES TO RELATED APPLICATIONS

The present application is based on, claims priority to, and incorporates herein by reference in its entirety, U.S. Provisional Patent Application No. 62/438,816, filed on Dec. 23, 2016, and entitled "Systems and Methods for Determining a Rack Interface for a Material Handling Vehicle."

STATEMENT REGARDING FEDERALLY SPONSORED RESEARCH

Not Applicable.

BACKGROUND

During a transportation process, operators of material handling vehicles detect the position of a racking structure through visualization by an operator. For example, a material handling vehicle may include a paint strip on the base leg, where the strip is used to identify where a mast to racking structure position is located.

SUMMARY OF THE INVENTION

The present invention relates to material handling vehicles and, more specifically, to systems and the methods for transporting a load to and from a storage rack using a material handling vehicle with a rack sensor arranged on one or more base legs thereof. The rack sensor is configured to detect a racking feature of a racking structure to provide an indication to an operator that the material handling vehicle is correctly positioned to transport a load to and from the racking structure.

In one aspect, the present invention provides a material handling vehicle configured to manipulate a load and interface with a racking structure. The material handling vehicle comprises a vehicle frame, one or more base legs coupled to and extending from the vehicle frame, a mast coupled to the vehicle frame, and a rack sensor arranged on the one or more base legs at a predetermined distance from a front face defined by the mast. The rack sensor is configured to detect a racking feature of the racking structure to provide an indication that the predetermined distance exists between the front face of the mast and the racking structure.

In another aspect, the present invention provides a method for determining a rack interface for a material handling vehicle. The material handling vehicle is configured to manipulate a load on a racking structure. The material handling vehicle includes a vehicle frame, one or more base legs coupled to and extending from the vehicle frame, a mast coupled to the vehicle frame, and a rack sensor arranged on the one or more base legs at a predetermined distance from a front face defined by the mast. The method includes acquiring data from the rack sensor as the material handling vehicle approaches the racking structure, determining if the rack sensor detects a racking feature of the racking structure, and upon determining that the rack sensor detects the racking feature, the sensor provides an indication that a front face of the mast is a predetermined distance from the racking structure.

The foregoing and other aspects and advantages of the invention will appear from the following description. In the description, reference is made to the accompanying drawings which form a part hereof, and in which there is shown by way of illustration embodiments of the invention. Such embodiments do not necessarily represent the full scope of the invention, however, and reference is made therefore to the claims and herein for interpreting the scope of the invention

DESCRIPTION OF DRAWINGS

The invention will be better understood and features, aspects and advantages other than those set forth above will become apparent when consideration is given to the following detailed description thereof. Such detailed description makes reference to the following drawings

DETAILED DESCRIPTION OF THE INVENTION

Figure 1:
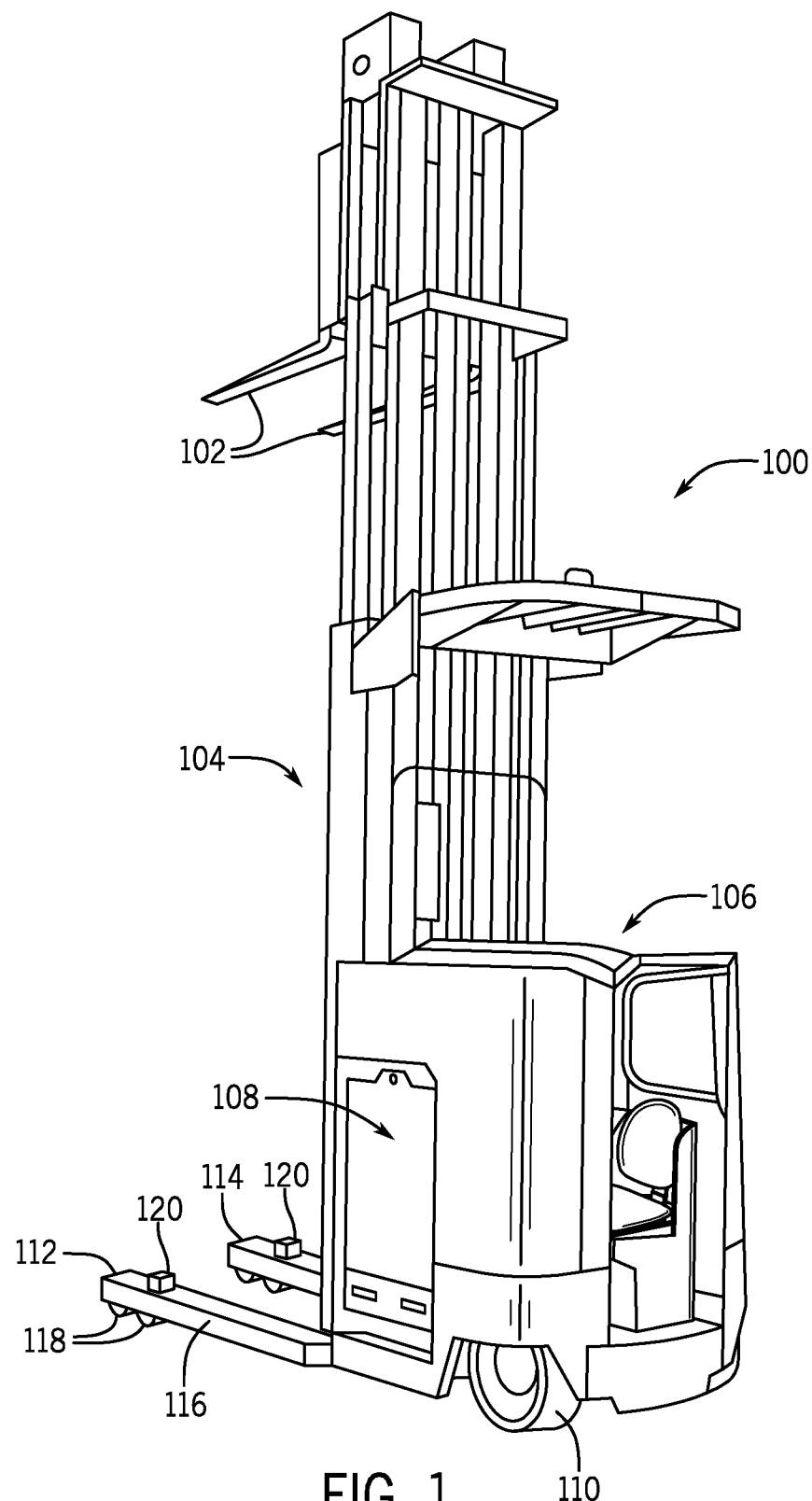
FIG. 1 is a perspective view of a material handling vehicle in accordance with one embodiment of the present invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

It is to be appreciated that material handling vehicles (MHVs) are designed in a variety of configurations to perform a variety of tasks. Although the MHV described herein is shown by way of example as a reach truck, it will be apparent to those of skill in the art that the present invention is not limited to vehicles of this type, and can also be provided in various other types of MHV configurations, including for example, orderpickers, swing reach vehicles, and any other lift vehicles. The various embodiments disclosed herein are suitable for both driver controlled, pedestrian controlled and remotely controlled MHVs.

FIG. 1 shows one non-limiting example of a MHV 100 in the form of a reach truck according to the present disclosure. The MHV 100 can include one or more forks 102 that are attached to a telescoping mast 104. The forks 102 may be raised and lowered by the telescoping mast 104, which can be attached to an operator compartment 106 that includes a power supply 108. The MHV 100 can include a traction wheel 110 configured to enable the MHV 100 to travel. In some non-limiting examples, the operator compartment 106 can include a seat for an operator, and an operating console to guide the MHV 100 and control the operation thereof. The operating console can include but is not limited to controls for steering, speed, and positioning the forks 102 on the MHV 100. It is to be appreciated that alternative embodiments of the MHV 100 may include a platform coupled to the telescoping mast 104 where the operator stands in the operator platform.

Figure 2:
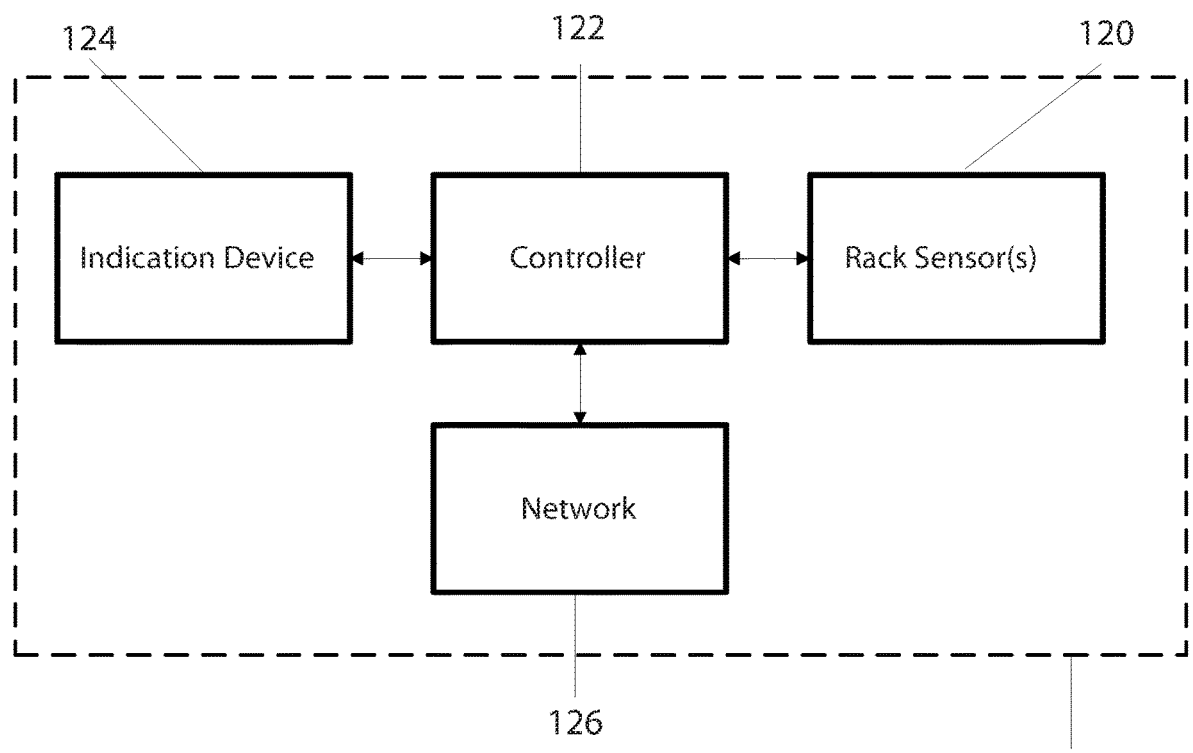
FIG. 2 is a schematic illustration of a rack positioning identification system of the material handling vehicle of FIG. 1.
Figure 3:
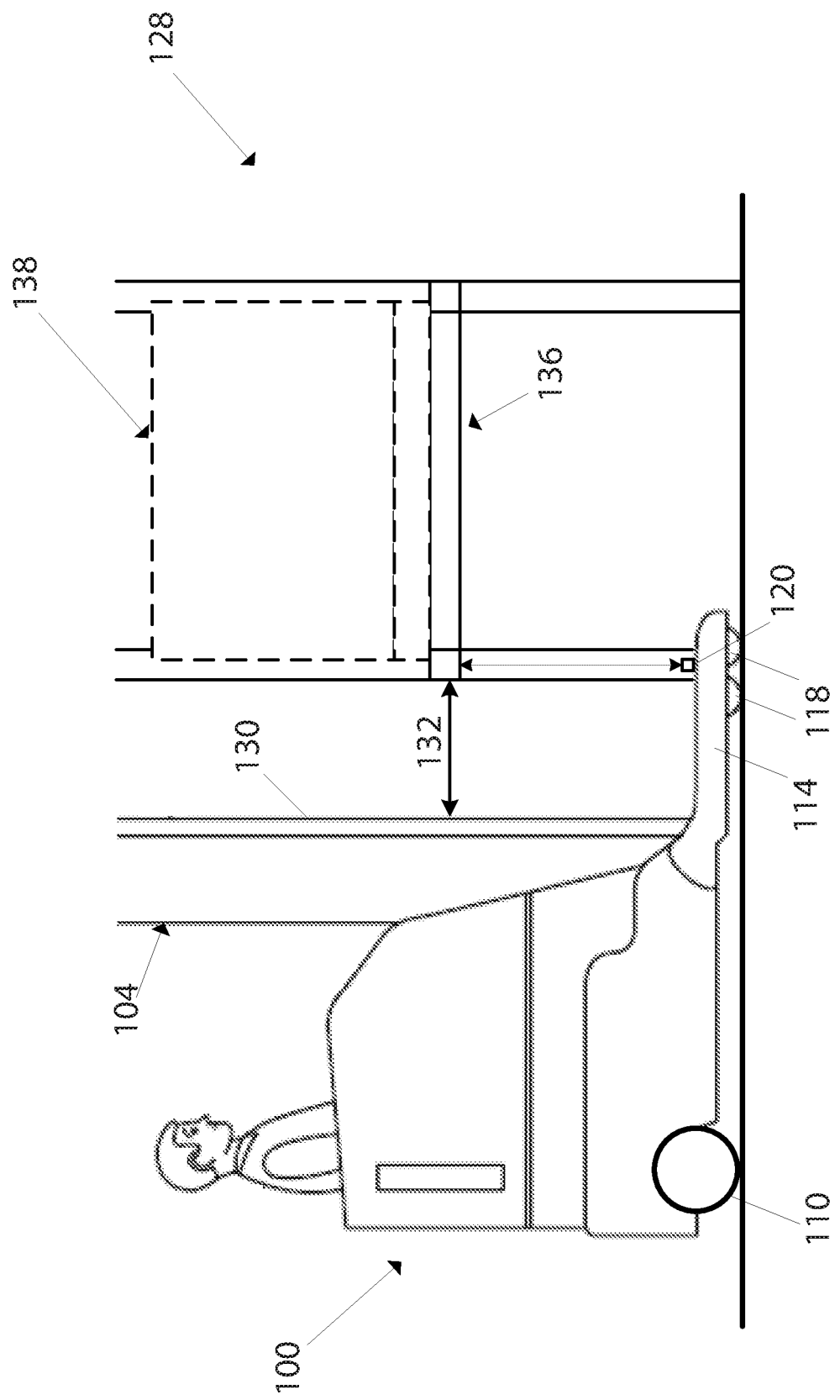
FIG. 3 is a side view of a material handling vehicle and a base leg positioning sensor detecting the position of a racking structure.

With reference to FIGS. 1-3, the MHV 100 can include a first base leg 112 and a second base leg 114. The first and second base legs 112 and 114 can extend outwardly away from the operator compartment 106 and define a lateral gap therebetween. In some non-limiting examples, the lateral gap between the first and second base legs 112 and 114 can be dimension to accommodate the forks 102. In some non-limiting examples, the first and second base legs 112 and 114 can provide structural support for the front end of the MHV 100. For example, the first and second base legs 112 and 114 at least partially support the telescoping mast 104 as the forks 102 are raised and lowered thereby.

Each of the first base leg 112 and the second base leg 114 can include a wheel mount 116 configured to receive one or more load wheels 118 therein. In some non-limiting examples, the load wheels 118 may swivel within the wheel mounts 116. In some non-limiting examples, the MHV 100 can comprise a rack sensor 120 arranged on at least one of the first base leg 112 and the second base leg 114. The illustrated MHV 100 can include a rack sensor 120 arranged on each of the first base leg 112 and the second base leg 114 (i.e., the first base leg 112 can include a first rack sensor 120 and the second base leg 114 can include a second rack sensor 120). In other non-limiting configurations, the MHV 100 may include a plurality of rack sensors 120 arranged along each of the first base leg 112 and the second base leg 114. This may facilitate sequentially indicating to an operator that the MHV 100 is reaching a desired position relative to a racking structure 128. The rack sensors 120 can be arranged at a predetermined distance 132 from a front face 130 defined by the mast 104. In some non-limiting examples, the front face 130 of the mast 104 can be a face of the mast 104 arranged closest to the racking structure 128, when the MHV 100 is manipulating a load on the racking structure 128. In some non-limiting examples, the predetermined distance 132 can be dimensioned to properly position the forks 102, which are movable coupled to the mast 104, relative to the racking structure 128 to ensure that a load is accurately placed thereon. The rack sensors 120 can be configured to detect a racking feature 136 on the racking structure 128, as will be described in detail below.

The MHV 100 can include a controller 122 in communication with the rack sensors 120, an indication device 124, and a network 126. In other embodiments, the controller 122 can be in communication with the indication device 124 over the network 126. The controller 122 can be configured to communicate wirelessly with the indication device 124 and the network 126 using WiFi, Bluetooth®, or any other wireless communication method known in the art or developed in the future. Alternatively or additionally, the controller 122 may be in wired communication with the indication device 124 and the network 126. In some non-limiting configurations, the rack sensors 120 may interface through a warehouse management system.

In one non-limiting example, the indication device 124 can be in the form of an LED light on control panel within the operator compartment 106 that can be triggered when the rack sensors 120 detects a racking feature or may progressively illuminate as the MHV 100 approaches the racking structure 128. In other embodiments, the indication device 124 may be in the form of other visual indicators, audible indicators, a plugging function, stopping a reach function, or other indication devices known in the art.

Figure 4:
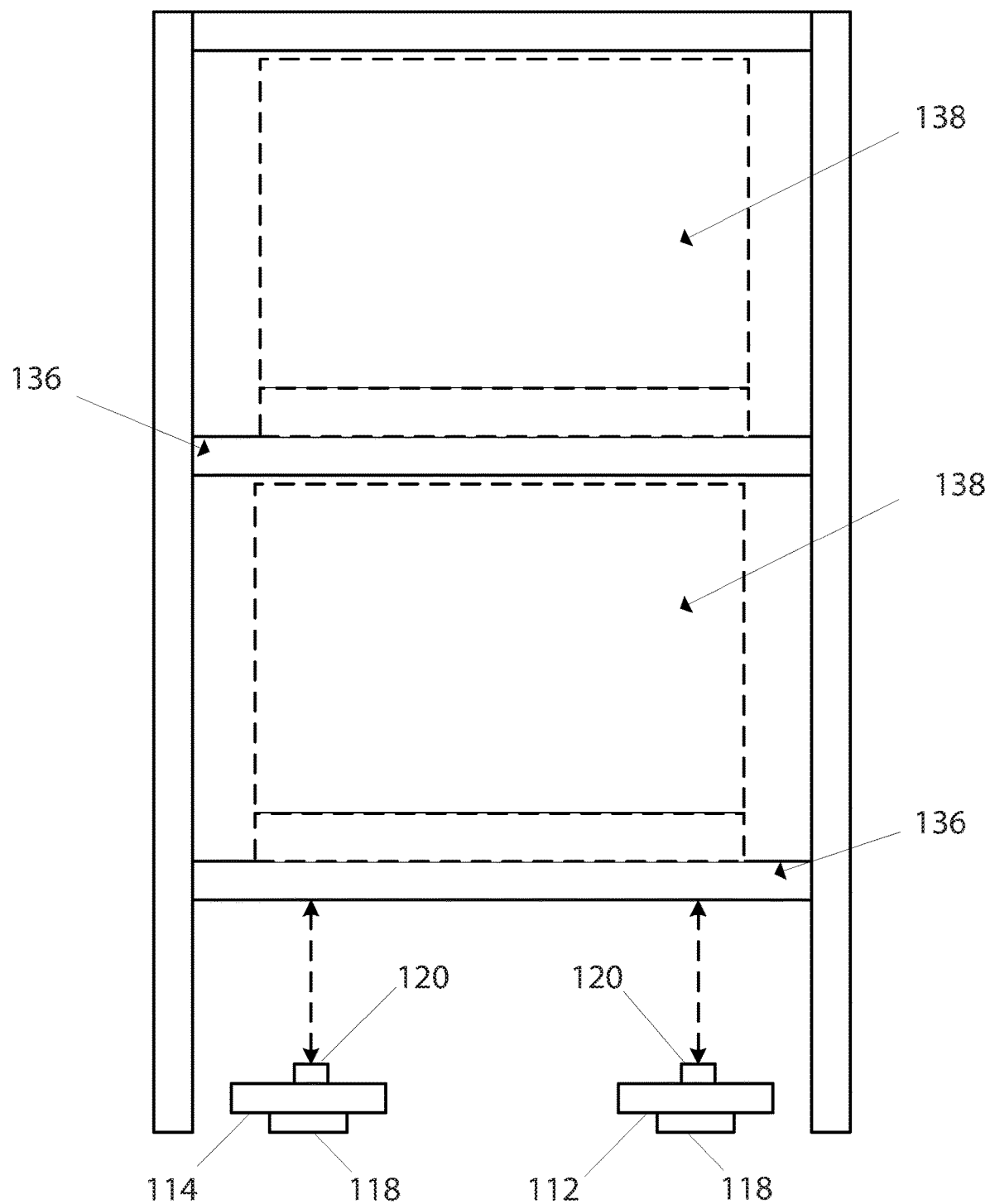
FIG. 4 is a front view of a material handling vehicle and multiple base leg positioning sensors being used to detect the position of a racking structure.
Figure 5:
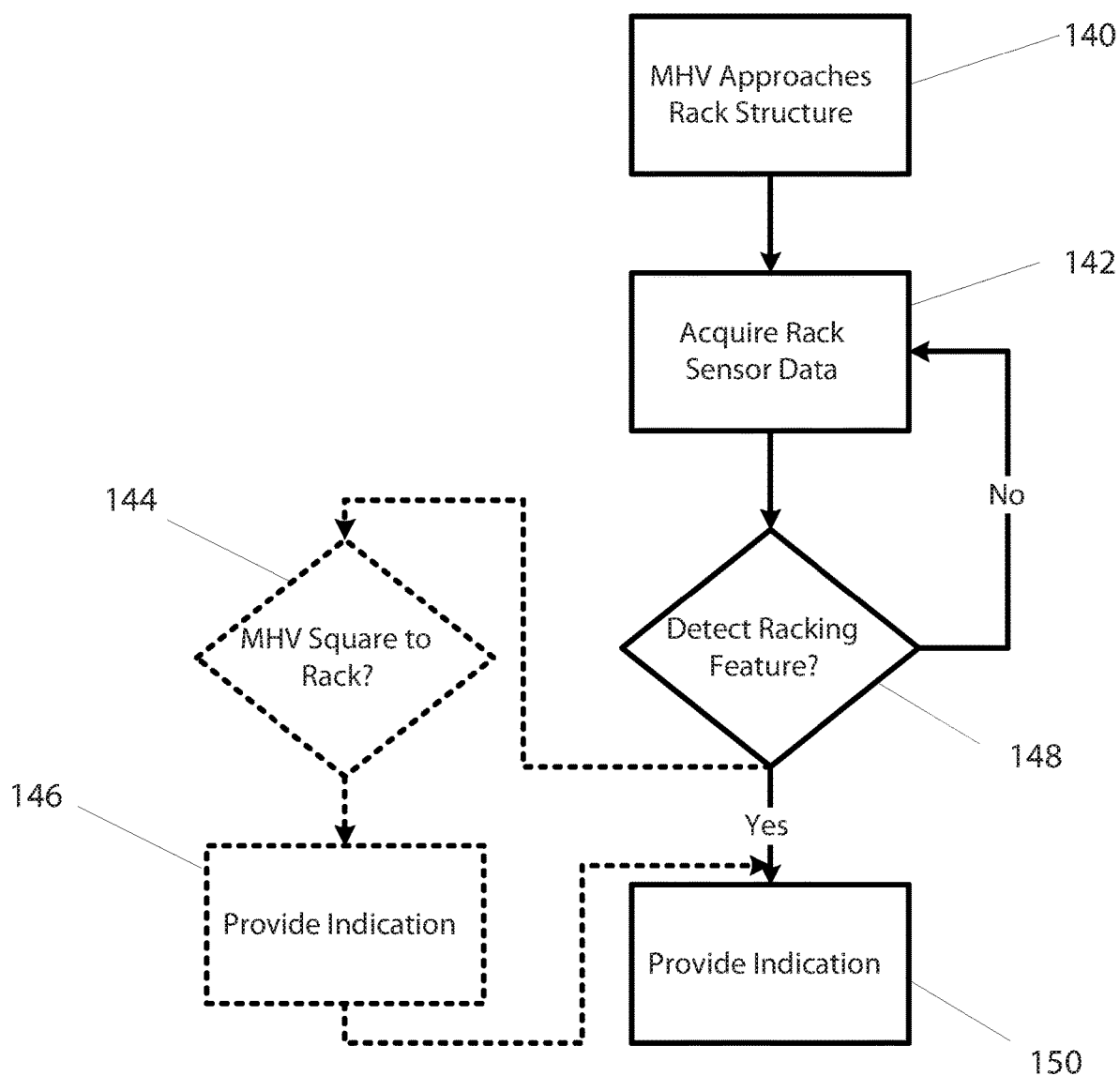
FIG. 5 is a flow chart setting forth steps for detecting a racking feature with a material handling vehicle according to one embodiment of the present invention.

Operation of the MHV 100 when manipulating a load 138 on a racking structure 128 will be described with reference to FIGS. 3-5. The racking feature 136 can be one or more structural elements of the racking structure 128, such as columns, shelving, and cross-members, as shown in FIGS. 3 and 4. In other embodiments, the racking feature 136 can be a target positioned on the racking structure 128 to provide indication to the operator that the MHV 100 is located at a predetermined distance 132 from the racking structure.

During operation, the MHV 100 can approach the racking structure 128 with a load 138 arranged on the forks 102 at step 140. As the MHV 100 approaches the racking structure 128, the rack sensors 120 can acquire data at step 142. In one non-limiting configuration, the rack sensors 120 may operate using a time of flight principle, where the rack sensors 120 sends a pulse toward the racking structure 128 to detect the racking feature 136. In other non-limiting configurations, the rack sensors 120 may comprise a multiple frequency phase-shift sensor, interferometry devices, a magnetic sensor, an optical sensor, or other detection sensors known in the art. At step 142, the rack sensors 120 may acquire data continuously or discretely (i.e., acquire data in predefined increments). Alternatively or additionally, at step 142, a proximity sensor coupled to the MHV 100 may detect the racking structure 128 and trigger the rack sensors 120 to begin acquiring data.

With the rack sensors 120 acquiring data at step 142, the controller 122 can monitor the data acquired by the rack sensors 120 and determine at step 148 if the rack sensors 120 detect a racking feature 136 of the racking structure 128. If a racking feature 136 is not detected at step 148, the rack sensors 120 can continue to acquire data at step 142. If a racking feature 136 is detected at step 148, the indication device 124 can provide an indication to the operator of the MHV 100 at step 150. As described above, the rack sensors 120 can be arranged such that the predetermined distance 132 exists between the front face 130 of the mast 104 and the rack sensors 120. Thus, when the rack sensors 120 detect a racking feature 136 and subsequently an indication to the operator is provided by the indication device 124, the predetermined distance 132 can exist between the front face 130 of the mast 104 and the racking structure 128. The predetermined distance 132 can be defined to ensure that the load 138 is positioned as desired when placed on the racking structure 128. That is, the rack sensors 120 can aid placement of the load 138 relative to the racking feature 136. For example, a width dimension of the load 138 (i.e., a dimension from left to right from the perspective of FIG. 3) can be known, or communicated to the controller 122 by a warehouse management system. The predetermined distance 132 can be sized to ensure that when the rack sensor 120 detects a racking feature 136, the forks 102 position the load 138 on the racking structure 128 so that the load 138 does not protrude from the racking structure 128. That is, the load 138 may be arranged in between the front and rear faces (left and right faces from the perspective of FIG. 3) of the racking structure 128. Thus, the rack sensor 120 can ensure that the MHV 100 accurately places loads on a racking structure.

Alternatively or additionally, if a racking feature 136 is detected at step 148, it can be determined if the MHV 100 is square to the racking structure 128 at step 144. That is, the rack sensors 120 can cooperate to determine a rotational orientation of the MHV 100 with respect to the racking structure 128. In other words, the rack sensors 120 can cooperate to detect if the front face 130 of the mast 104 can be substantially parallel to the racking structure 128. As described above, in some non-limiting examples, the first base leg 112 and the second base leg 114 can each include a rack sensor 120. Thus, it can be determined at step 144 if both of the rack sensors 120 detect a racking feature 136 within a predetermined amount of time (e.g., 0.1 seconds, 0.5 seconds, 1.0 seconds, etc.). If so, it can be determined that the MHV 100 can be square to the racking structure 128 at step 144 and, subsequently, an indication can be provided to the operator by the indication device 124 indicating the same at step 146. If not, it can be determined that the MHV 100 can be arranged askew with respect to the racking structure 128 and an indication can be provided to the operator by the indication device 124 indicating the same at step 146. Thus, in addition to ensuring that a load is accurately placed on a racking structure, the rack sensors 120 also enable the MHV 100 to rotationally align the load onto the racking structure.

It should be appreciated that the use of the term "rack" herein is not meant to be limiting in any way, and the MHVs described herein are capable of interfacing with alternative storage structures, as would be appreciated by one of skill in the art.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

I claim:

1. A material handling vehicle configured to manipulate a load and interface with a racking structure, the material handling vehicle comprising:
   a vehicle frame;
   one or more base legs coupled to and extending from the vehicle frame;
   a mast coupled to the vehicle frame; and
   a rack sensor arranged on the one or more base legs at a predetermined distance from a front face defined by the mast, wherein the rack sensor is configured to detect a racking feature of the racking structure,
   wherein when the rack sensor detects the racking feature of the racking structure, an indication is triggered that indicates that the predetermined distance exists between the front face of the mast and the racking structure.

2. The material handling vehicle of claim 1, wherein the one or more base legs comprises a first base leg and a second base leg.

3. The material handling vehicle of claim 2, wherein the first base leg includes a first rack sensor and the second base leg includes a second rack sensor.

4. The material handling vehicle of claim 3, wherein the first rack sensor and the second rack sensor cooperate to detect a rotational orientation of the material handling vehicle with respect to the racking structure.

5. The material handling vehicle of claim 3, wherein the first rack sensor and the second rack sensor cooperate to detect if the front face of the mast is substantially parallel to the racking structure.

6. The material handling vehicle of claim 1, further comprising an indication device configured to provide the indication that the predetermined distance exists between the front face of the mast and the racking structure, and wherein the indication device is configured to provide a progressive indication as the rack sensor approaches the racking structure.

7. The material handling vehicle of claim 1, further comprising a proximity sensor, wherein the proximity sensor is configured to detect the racking structure and, upon detection of the racking structure, trigger the rack sensor to begin acquiring data.

8. The material handling vehicle of claim 1, wherein the predetermined distance is sized to ensure that when the rack sensor detects the racking feature, a pair of forks coupled to the mast are positioned to place the load on the racking structure so that the load does not protrude from the racking structure.

9. A material handling vehicle configured to manipulate a load and interface with a racking structure, the material handling vehicle comprising:
   a vehicle frame;
   a first base leg coupled to and extending from the vehicle frame;
   a second base leg coupled to and extending from the vehicle frame, wherein the second base leg is spaced from the first base leg;
   a mast coupled to the vehicle frame; and
   a first rack sensor arranged on the first base leg at a predetermined distance from a front face defined by the mast; and
   a second rack sensor arranged on the second base leg at the predetermined distance from the front face of the mast, wherein the first rack sensor and the second rack sensor are configured to detect a racking feature of the racking structure, and when the first rack sensor and/or the second rack sensor detect the racking feature of the racking structure, an indication is triggered that indicates that the predetermined distance exists between the front face of the mast and the racking structure.

10. The material handling vehicle of claim 9, wherein the first rack sensor and the second rack sensor cooperate to detect a rotational orientation of the material handling vehicle with respect to the racking structure.

11. The material handling vehicle of claim 9, wherein the first rack sensor and the second rack sensor cooperate to detect if the front face of the mast is substantially parallel to the racking structure.

12. The material handling vehicle of claim 9, further comprising an indication device configured to provide an indication as the first rack sensor and/or the second rack sensor approaches the racking structure.

13. The material handling vehicle of claim 9, further comprising an indication device configured to provide the indication that the predetermined distance exists between the front face of the mast and the racking structure, and wherein the indication device is configured to provide a progressive indication as the first rack sensor and/or the second rack sensor approaches the racking structure.

14. The material handling vehicle of claim 9, further comprising a proximity sensor, wherein the proximity sensor is configured to detect the racking structure and, upon detection of the racking structure, trigger the first rack sensor and the second rack sensor to begin acquiring data.

15. The material handling vehicle of claim 9, wherein the first base leg is spaced from the second base leg to accommodate a pair of forks therebetween, and wherein the pair of forks are movable coupled to the mast.

16. The material handling vehicle of claim 15, wherein the predetermined distance is sized to ensure that when the first rack sensor and/or the second rack sensor detects the racking feature, the pair of forks are positioned to place the load on the racking structure so that the load does not protrude from the racking structure.

17. A method for determining a rack interface for a material handling vehicle, the material handling vehicle configured to manipulate a load on a racking structure, the material handling vehicle including a vehicle frame, one or more base legs coupled to and extending from the vehicle frame, a mast coupled to the vehicle frame, and a rack sensor arranged on the one or more base legs at a predetermined distance from a front face defined by the mast, the method comprising:

acquiring data from the rack sensor as the material handling vehicle approaches the racking structure;

determining if the rack sensor detects a racking feature of the racking structure; and upon determining that the rack sensor detects the racking feature, providing an indication that a front face of the mast is the predetermined distance from the racking structure.

18. The method of claim 17 further comprising:

acquiring data from a second rack sensor arranged on a second base leg.

19. The method of claim 18 further comprising:

determining if the front face of the mast is arranged substantially parallel to the racking structure based on the data acquired by the rack sensor and the second rack sensor.

20. The method of claim 19 wherein determining if the front face of the mast is arranged substantially parallel to the racking structure based on the data acquired by the rack sensor and the second rack sensor comprises:

determining if the rack sensor and the second rack sensor detect the racking feature within a predetermined amount of time of one another.

\* \* \* \* \*